United States Patent
Browder et al.

(12)

(10) Patent No.: US 6,279,514 B1
(45) Date of Patent: Aug. 28, 2001

(54) METHOD OF RECOVERING HEAT IN SULFURIC ACID PRODUCTION PLANT

(75) Inventors: Timothy J. Browder, 8809 Hardy Way, Gold Hill, OR (US) 97525; Todd W. Browder; Dora J. Browder, both of Gold Hill, OR (US); Yoichi Yokoyama, Osaka (JP); Yozo Nakamura, Osaka (JP); Takeshi Katagiri, Osaka (JP)

(73) Assignees: Timothy J. Browder, Gold Hill, OR (US); Hitachi Zosen Corporation, Osaka (JP)

( * ) Notice: Subject to any disclaimer, the term of this patent is extended or adjusted under 35 U.S.C. 154(b) by 0 days.

(21) Appl. No.: 09/634,883

(22) Filed: Aug. 7, 2000

(51) Int. Cl.[7] ............................. C01B 17/69; C01B 17/86
(52) U.S. Cl. .......................................... 122/7 R; 423/522
(58) Field of Search ..................... 122/1 R, 7 C, 122/7 R; 423/522, 532

(56) References Cited

U.S. PATENT DOCUMENTS

| | | | |
|---|---|---|---|
| 4,582,122 | * | 4/1986 | Fan .................................. 122/DIG. 1 |
| 5,118,490 | * | 6/1992 | McAlister ............................. 423/522 |
| 5,130,112 | * | 7/1992 | McAlister et al. ..................... 423/522 |
| 5,554,350 | * | 9/1996 | Gurvich et al. ....................... 423/522 |
| 5,711,928 | * | 1/1998 | Morisaki ............................... 423/522 |

* cited by examiner

Primary Examiner—Gregory Wilson
(74) Attorney, Agent, or Firm—Armstrong, Westerman, Hattori, McLeland & Naughton LLP

(57) ABSTRACT

The invention provides a heat recovery method for use in sulfuric acid production plants by which the heat generated in the step of drying $SO_2$ gas or the step of drying air, and the step of absorbing sulfur trioxide in the plant is effectively utilized for heating the water to be supplied to a boiler although the heat is conventionally discarded because of the difficulties encountered in using the heat effectively. The boiler water to be supplied is heated by utilizing the heat generated by drying and/or absorption in a drying tower of the plant for drying sulfur burning air or the sulfur dioxide and/or in an absorption tower of the plant for causing circulating concentrated sulfuric acid to absorb sulfur trioxide produced by the conversion of the sulfur dioxide.

3 Claims, 9 Drawing Sheets

METHOD OF RECOVERING HEAT IN SULFURIC ACID PRODUCTION PLANT

BACKGROUND OF THE INVENTION

Sulfuric acid production plants include those of the sulfur combustion type or waste sulfuric acid combustion type which are designed to generate high-pressure superheated steam useful as a power generation heat source or turbine drive source or for other application by using the heat of sulfur dioxide gas of high temperature produced in the plant. The present invention relates to a method for use in sulfuric acid production plants of such type which is adapted to generate a greater amount of steam by utilizing the heat generated in a drying tower and/or an absorption tower for heating the water to be supplied to a boiler.

The conventional sulfuric acid production plant of the sulfur combustion type has a drying tower for drying air for burning the material, i.e., molten sulfur, with circulating concentrated sulfuric acid, and an absorption tower for causing the circulating concentrated sulfuric acid to absorb sulfur trioxide produced by the conversion of sulfur dioxide. The drying and absorption involve generation of heat, which is not suited for recovery, therefore cooled with cooling water for removal and eventually released into the atmosphere since the circulating concentrated sulfuric acid can not be given a higher temperature because of the limitations imposed on the material used for the circulating acid system.

The development of new materials in recent years has made it possible to raise the temperature of the circulating concentrated sulfuric acid to about 200 to about 220° C. This has led to the proposal of techniques for recovering the heat generated in the drying tower and absorption tower in the form of saturated steam of 500 to 600 kPa(G), whereas the steam is low in pressure and therefore of low value for use as steam.

SUMMARY OF THE INVENTION

An object of the present invention is to provide a heat recovery method for use in sulfuric acid production plants by which the heat generated in the step of drying $SO_2$ gas or the step of drying air, and the step of absorbing sulfur trioxide in the plant can be effectively utilized for heating the water to be supplied to a boiler although the heat is conventionally discarded because of the difficulties encountered in using the heat effectively.

For use in a sulfuric acid production plant including a drying tower for drying air with circulating concentrated sulfuric acid for burning molten sulfur serving as a material, a sulfur combustion furnace for burning the molten sulfur to produce sulfur dioxide, a converter for converting the sulfur dioxide to sulfur trioxide, and an absorption tower for causing the circulating concentrated sulfuric acid to absorb the sulfur trioxide produced by the conversion of the sulfur dioxide, the present invention provides a heat recovery method of heating the water to be supplied to a boiler by utilizing the heat generated by drying and/or absorption in the drying tower for drying the sulfur burning air or the sulfur dioxide and/or in the absorption tower for causing the circulating concentrated sulfuric acid to absorb the sulfur trioxide produced by the conversion of the sulfur dioxide.

Preferably, the water to be supplied to the boiler is heated by being passed through an acid cooler for cooling the drying tower and/or the absorption tower by circulating concentrated sulfuric acid therethrough.

The heat generated in the step of drying $SO_2$ gas or the step of drying air, and the step of absorbing sulfur trioxide in the sulfuric acid production plant can be effectively utilized by the method of the invention for heating the water to be supplied to a boiler whereas the heat is conventionally discarded because of the difficulties encountered in using the heat effectively.

DESCRIPTION OF THE PREFERRED EMBODIMENTS

The method of the present invention will be described below in detail with reference to the illustrated embodiments.

Embodiment 1

Figure 1:
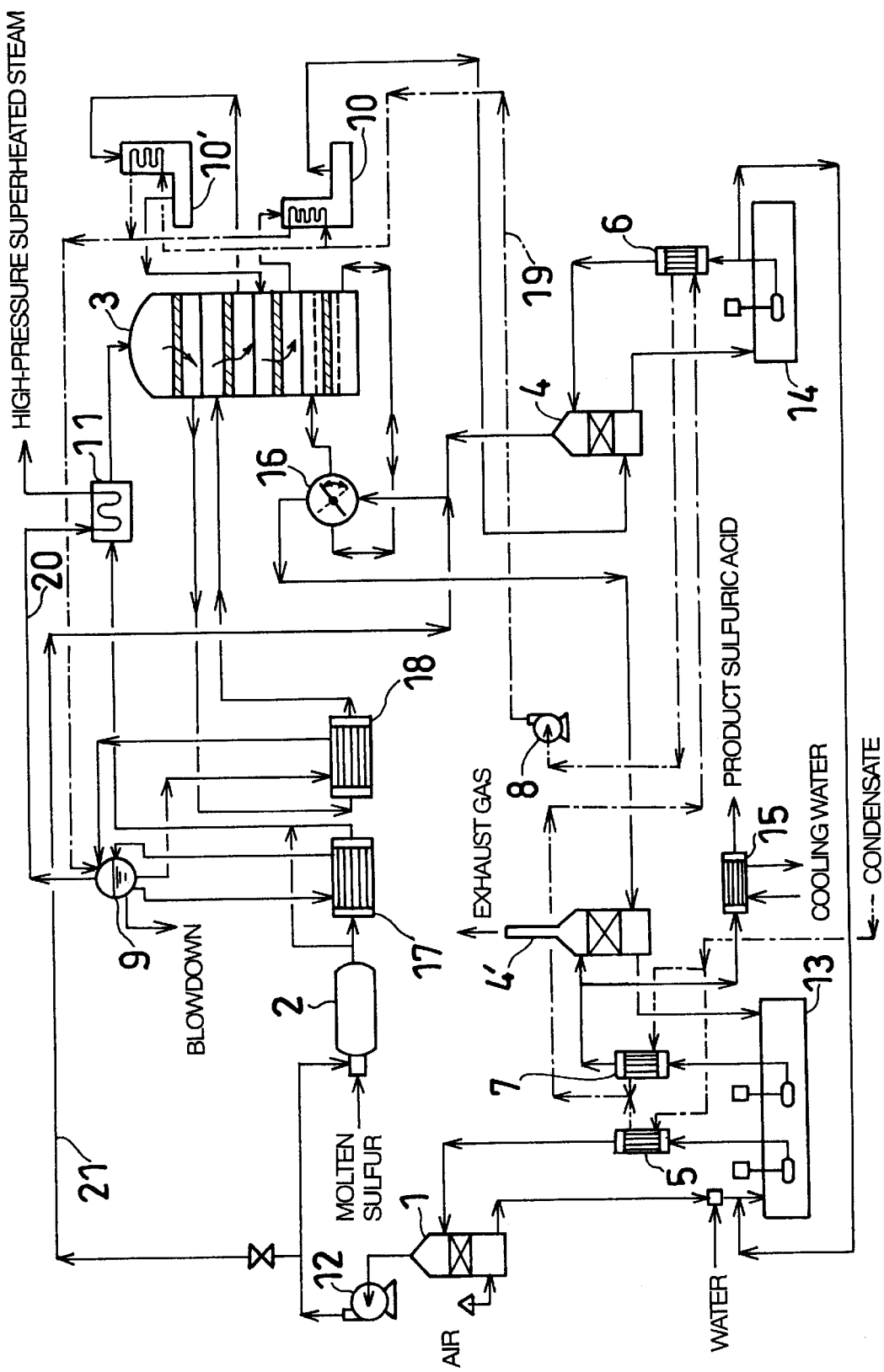
FIG. 1 is a flow chart showing Embodiment 1.

With reference to the process flow chart of FIG. 1, the sulfuric acid production plant illustrated mainly comprises a drying tower 1 for drying air with circulating concentrated sulfuric acid for burning molten sulfur serving as a material, a sulfur combustion furnace 2 for burning the molten sulfur to produce sulfur dioxide, a converter 3 for converting the sulfur dioxide to sulfur trioxide, and first and second absorption towers 4, 4' for causing the circulating concentrated sulfuric acid to absorb the sulfur trioxide produced by the conversion of the sulfur dioxide.

Heat is generated when water is absorbed by the circulating concentrated sulfuric acid in the drying tower 1. Heat is generated also when the sulfur trioxide is absorbed by the circulating concentrated sulfuric acid in the first and second absorption towers 4, 4'.

The drying tower 1 and the first and second absorption towers 4, 4' are provided with respective acid coolers 5, 6, 7 for the concentrated sulfuric acid circulating system. These coolers cool the generated heat. The concentrated sulfuric acid to be circulated has a concentration of 98 wt. %.

The water (condensate) to be supplied to boilers from utility equipment is first concurrently passed through the drying tower acid cooler 5 and the second absorption tower acid cooler 7 which are relatively low (60 to 90° C.) in concentrated sulfuric acid circulation temperature, whereby the water is heated to some extent. The boiler water is then passed through the first absorption tower acid cooler 6 which is high (90 to 120° C.) in the acid circulation temperature, whereby the water is further heated.

The water (about 90° C.) flowing out of the first absorption tower acid cooler 6 has its pressure elevated by a boiler water supply pump 8 to a level at which the water can be supplied to a boiler steam drum 9. The water given the elevated pressure is further heated in first and second economizers 10, 10'0 with the heat from the converter 3, partly evaporated and given heat of higher temperature.

The boiler water to be supplied is made into high-pressure steam when supplied to the boiler steam drum 9, further supplied to a steam superheater 11 downstream from the drum and eventually made into high-pressure superheated steam having a higher value for use. The high-pressure superheated steam is useful as a power generation heat source or turbine drive source or for other application.

Indicated at 12 in FIG. 1 is an air blower, at 13, 14 are pump tanks, and at 15 is a product acid cooler, at 16 a directional control valve, at 17 a first boiler, at 18 a second boiler, at 19 a boiler water supply line, at 20 a high-pressure steam line and at 21 a dilution air line.

When the method (conventional method) wherein cooling water is used for cooling the concentrated sulfuric acid circulated through the drying tower 1 and the first and second absorption towers 4, 4' is compared with the method (of the invention) wherein the boiler water to be supplied is used for cooling the acid, the latter method is about 15% greater than the former in the amount of high-pressure superheated steam produced, in the case where the sulfuric acid production plant of the sulfur combustion type shown in the flow chart of FIG. 1 has a production capacity of 1800 tons/day.

Embodiments 2–9

Figure 2:
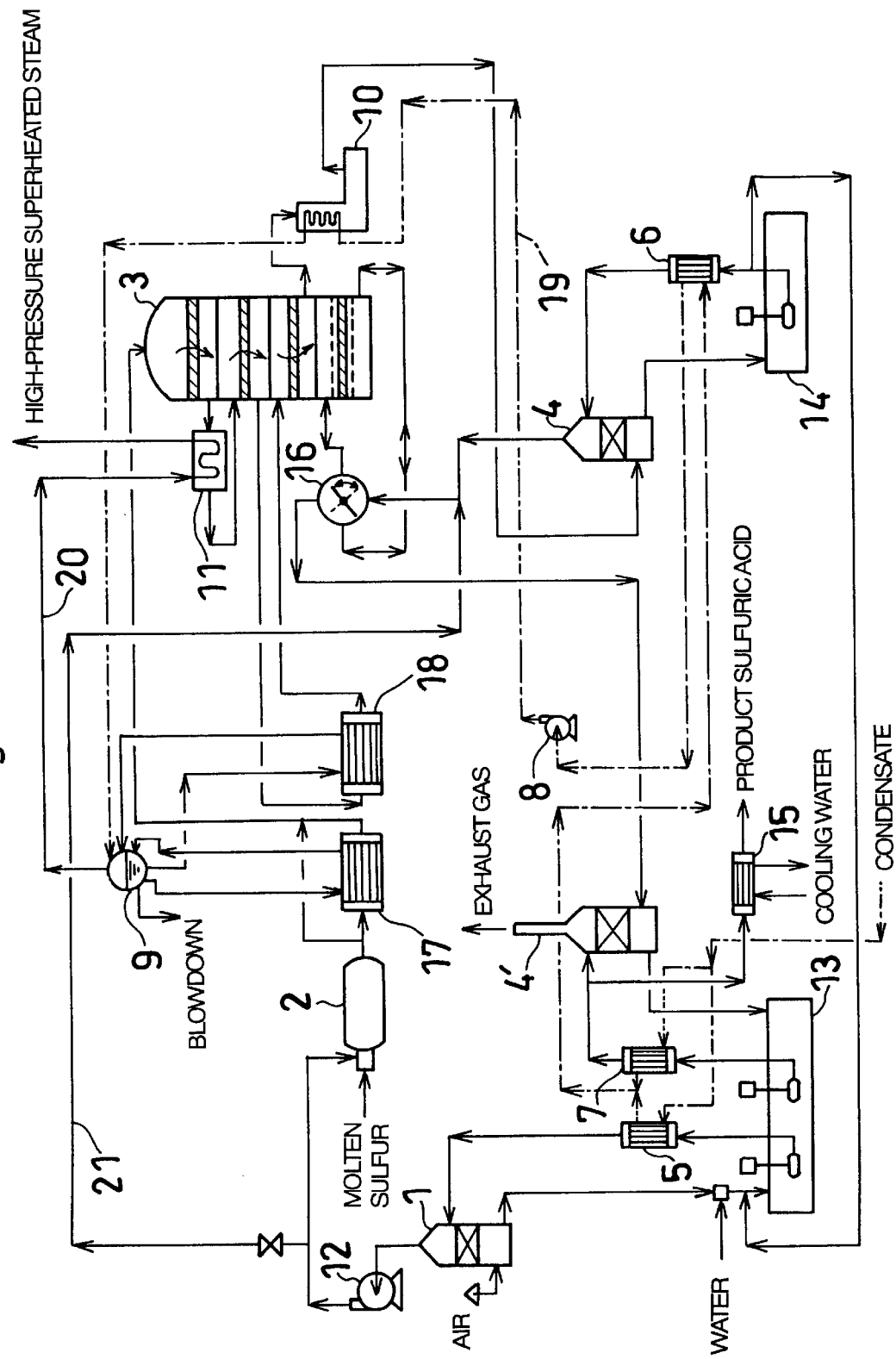
FIG. 2 is a flow chart showing Embodiment 2.
Figure 3:
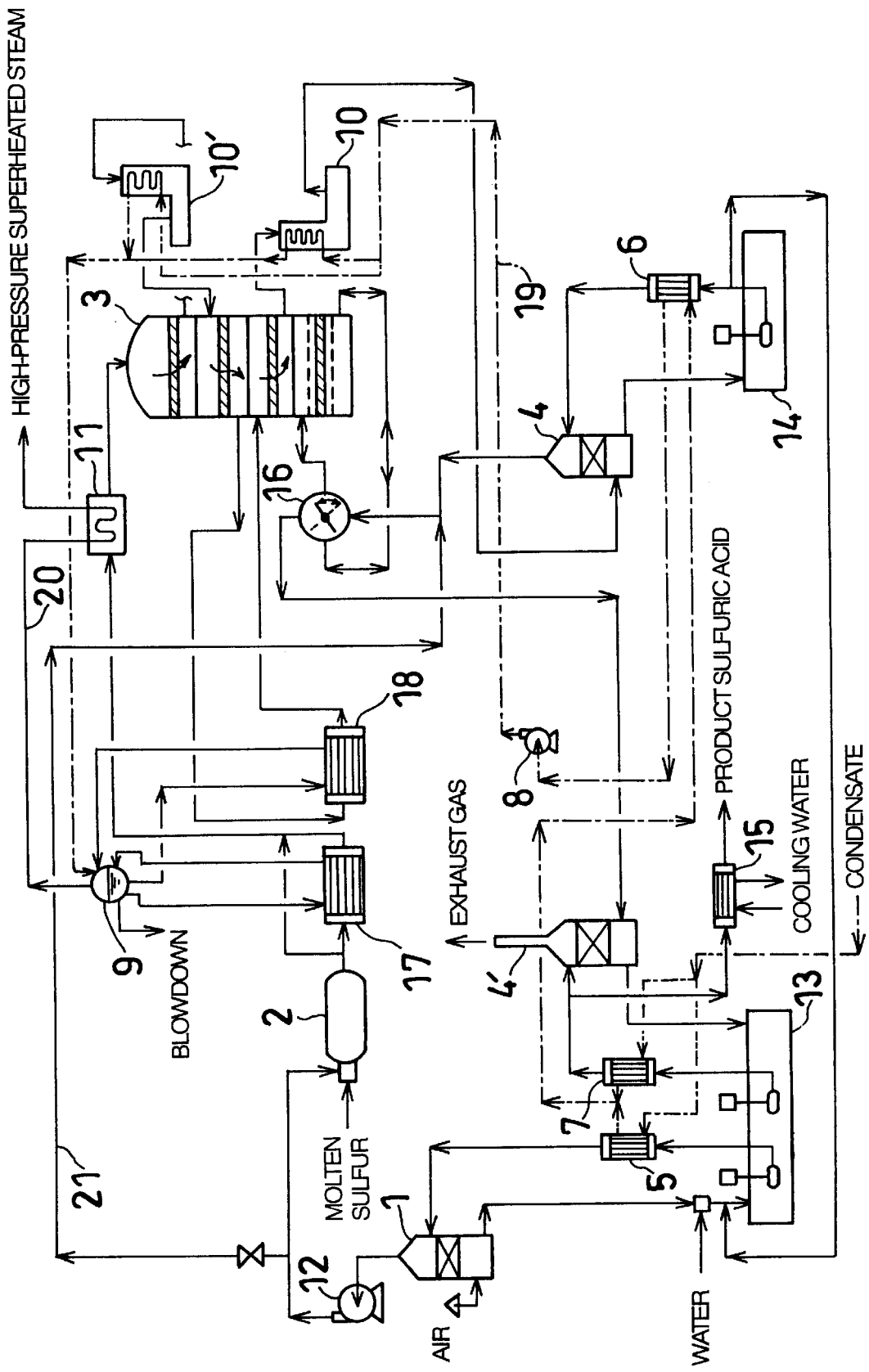
FIG. 3 is a flow chart showing Embodiment 3.
Figure 4:
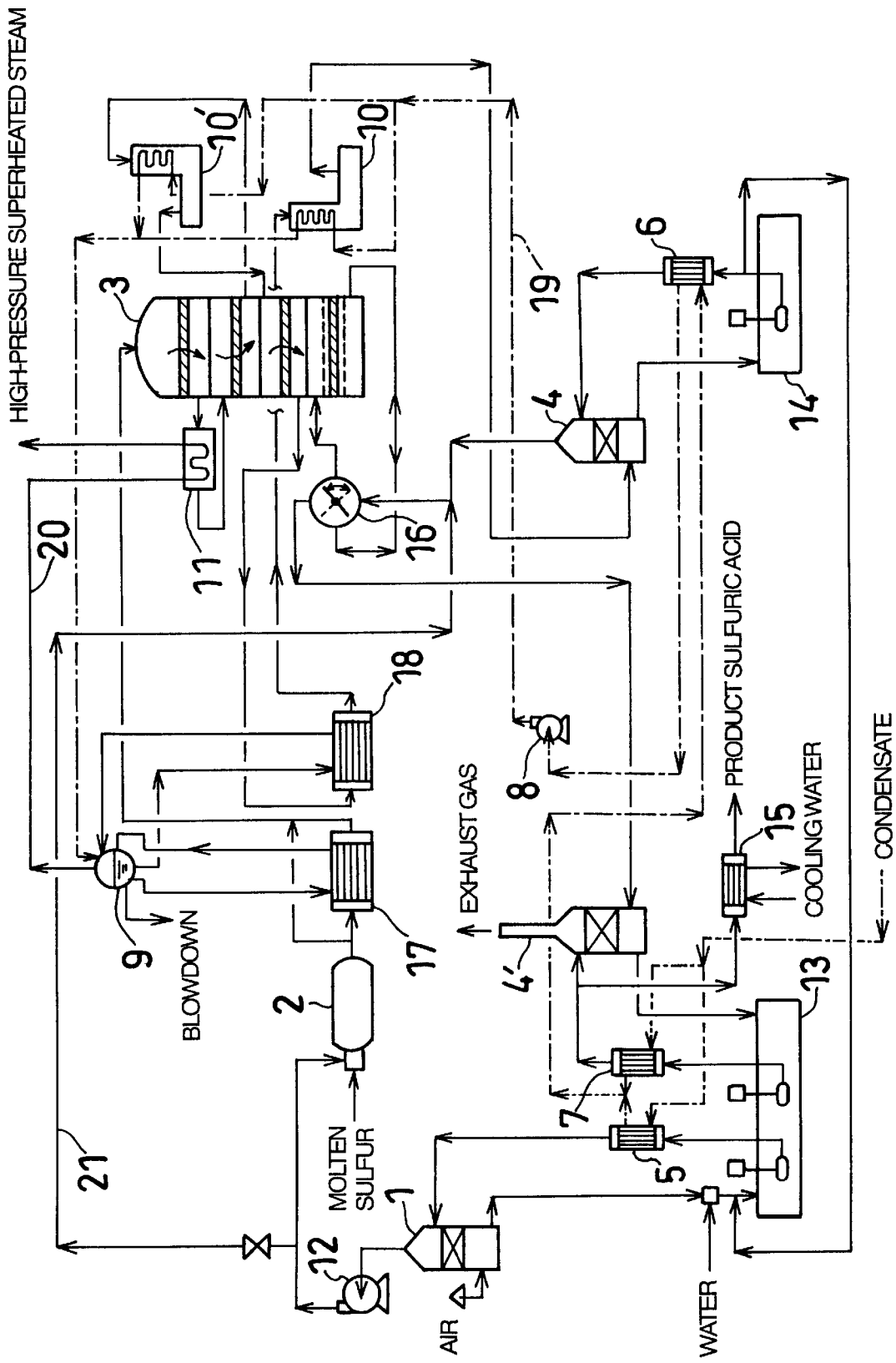
FIG. 4 is a flow chart showing Embodiment 4.
Figure 5:
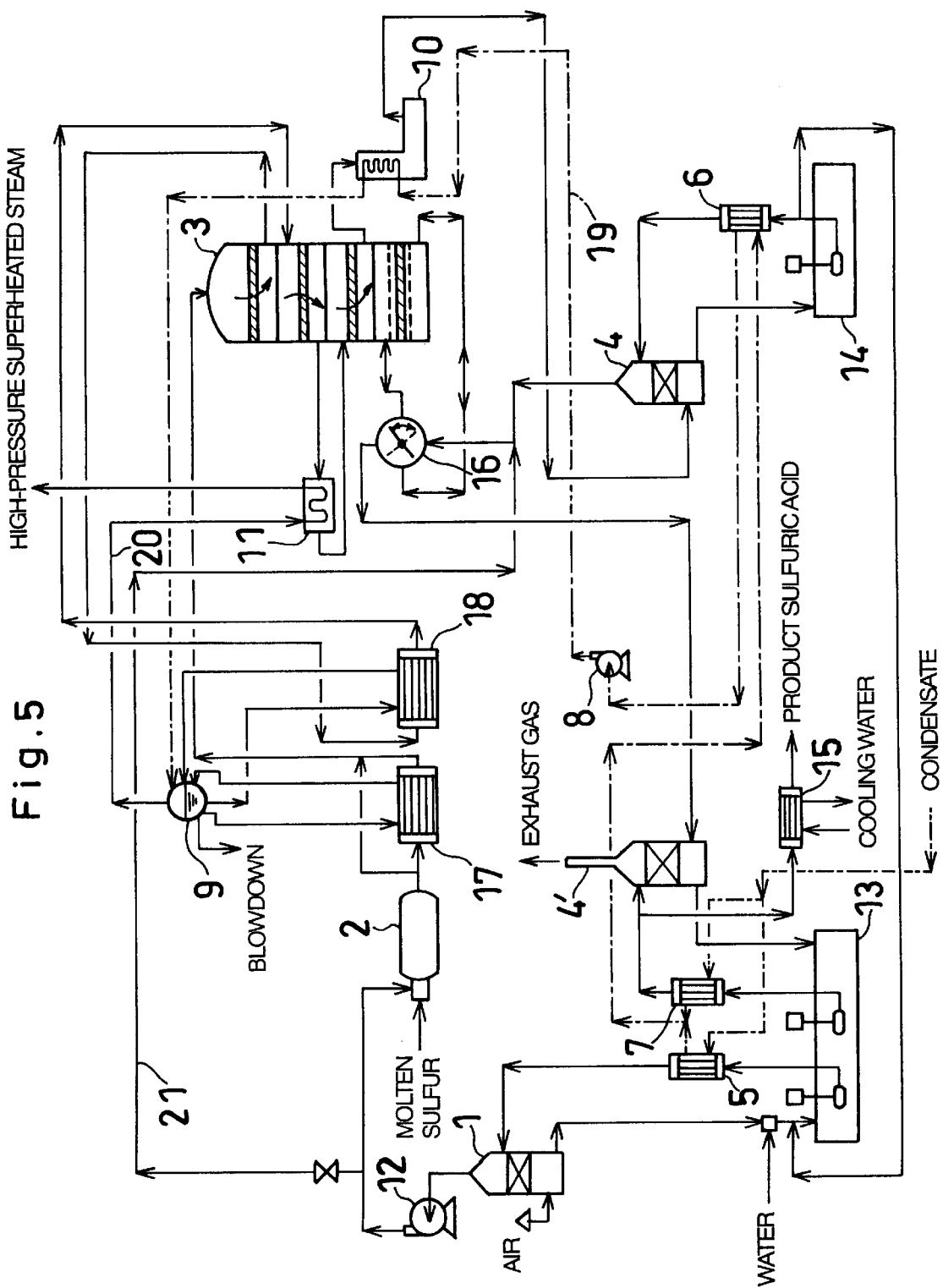
FIG. 5 is a flow chart showing Embodiment 5.
Figure 6:
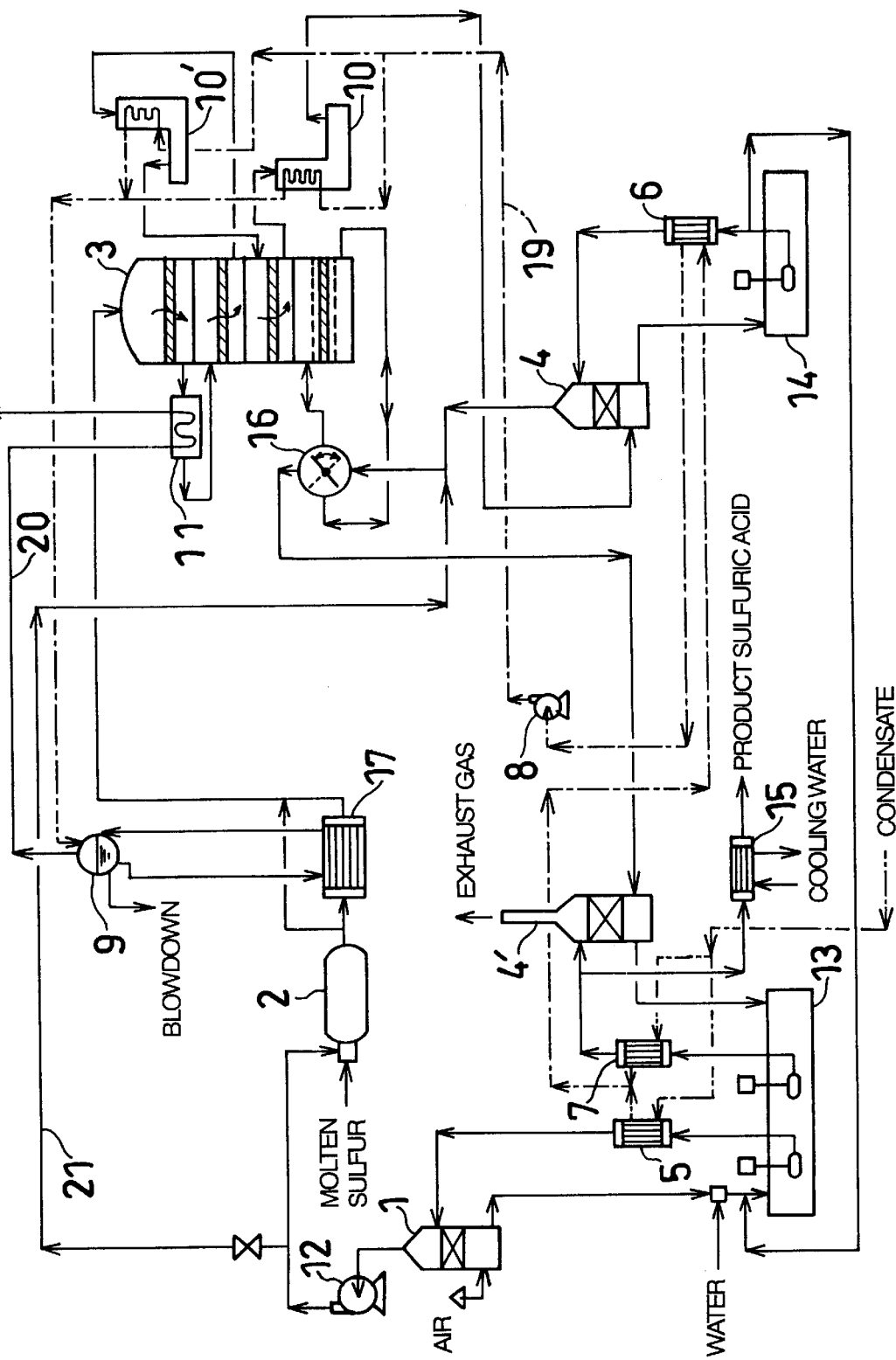
FIG. 6 is a flow chart showing Embodiment 6.
Figure 7:
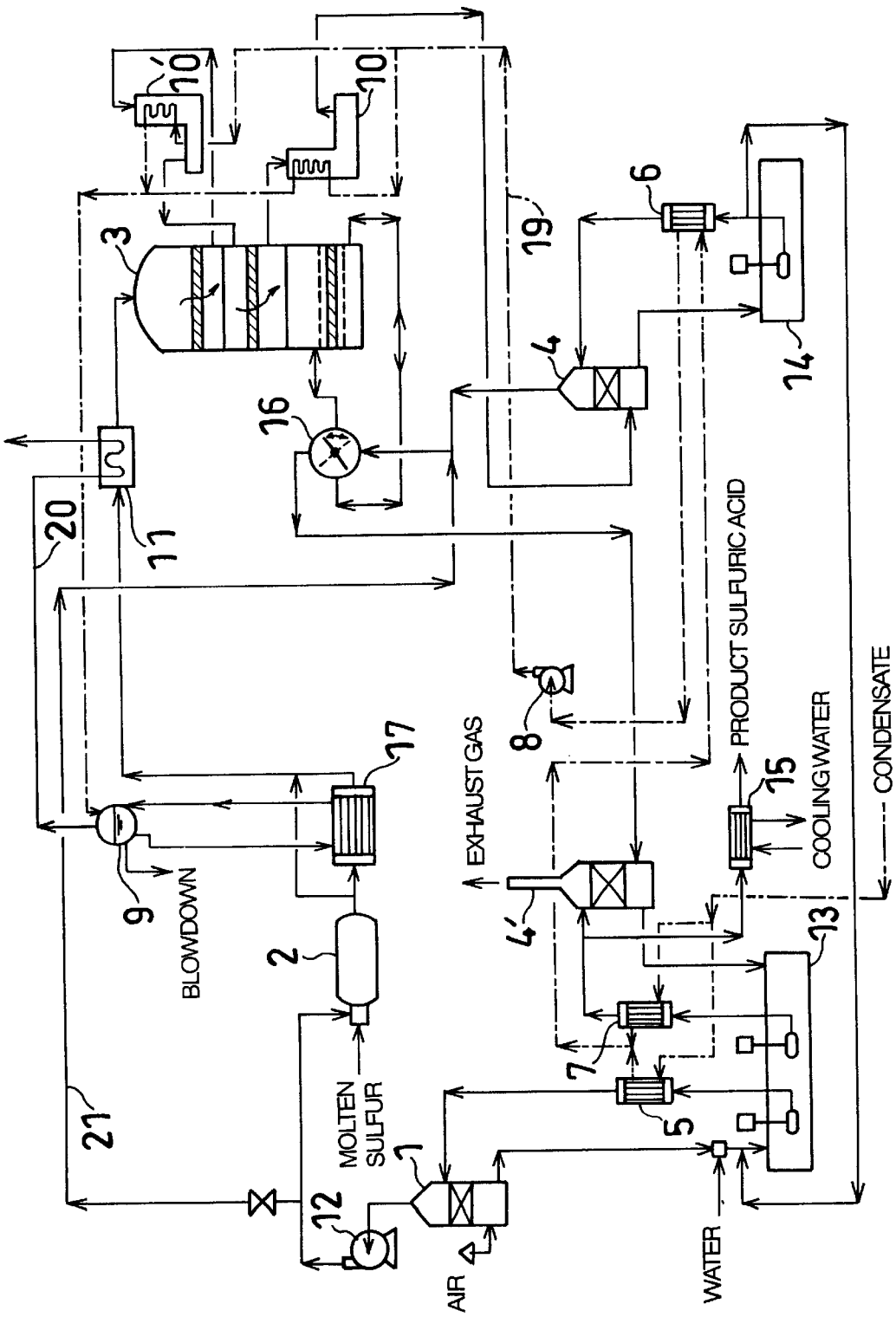
FIG. 7 is a flow chart showing Embodiment 7.
Figure 8:
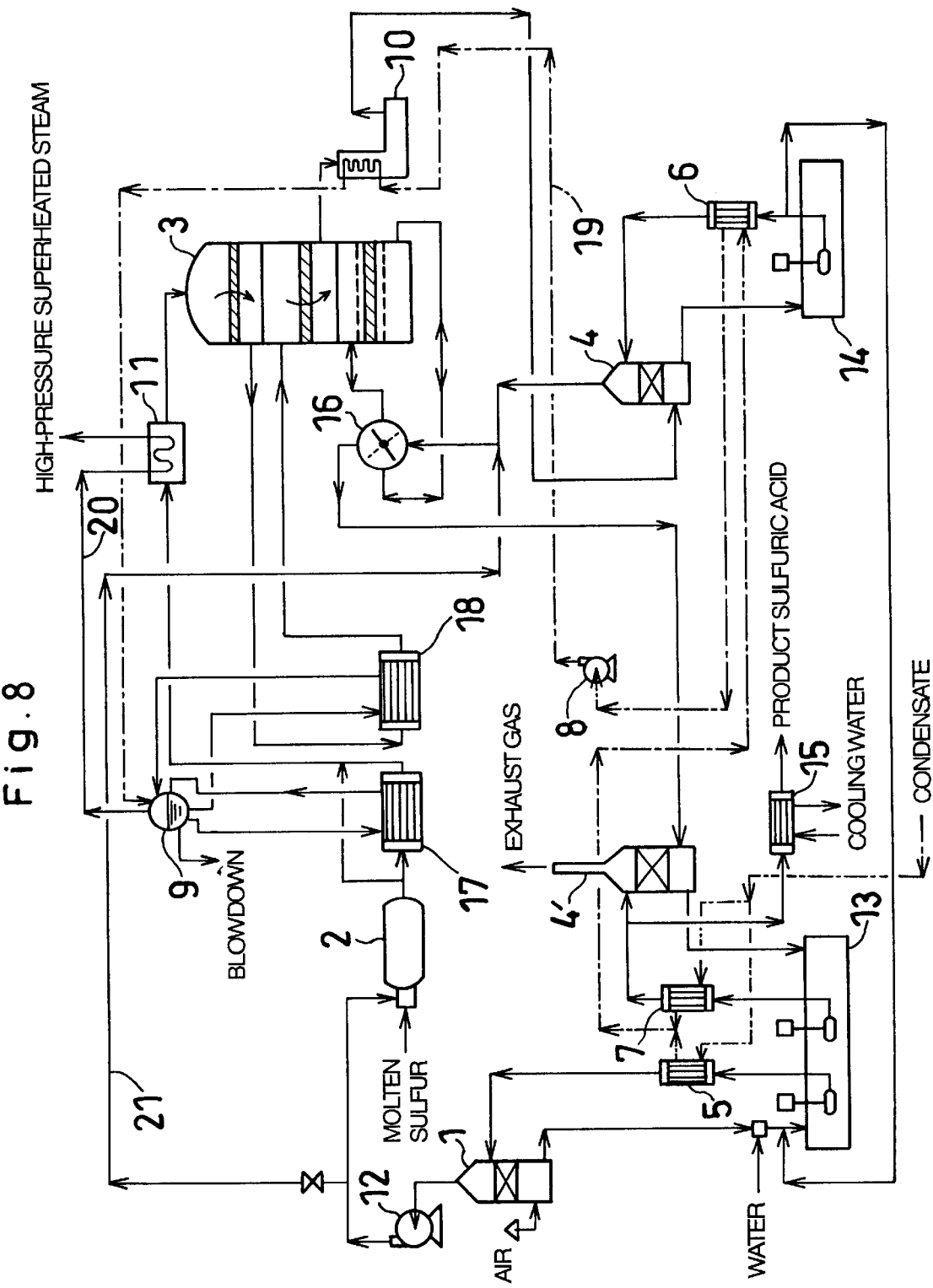
FIG. 8 is a flow chart showing Embodiment 8.
Figure 9:
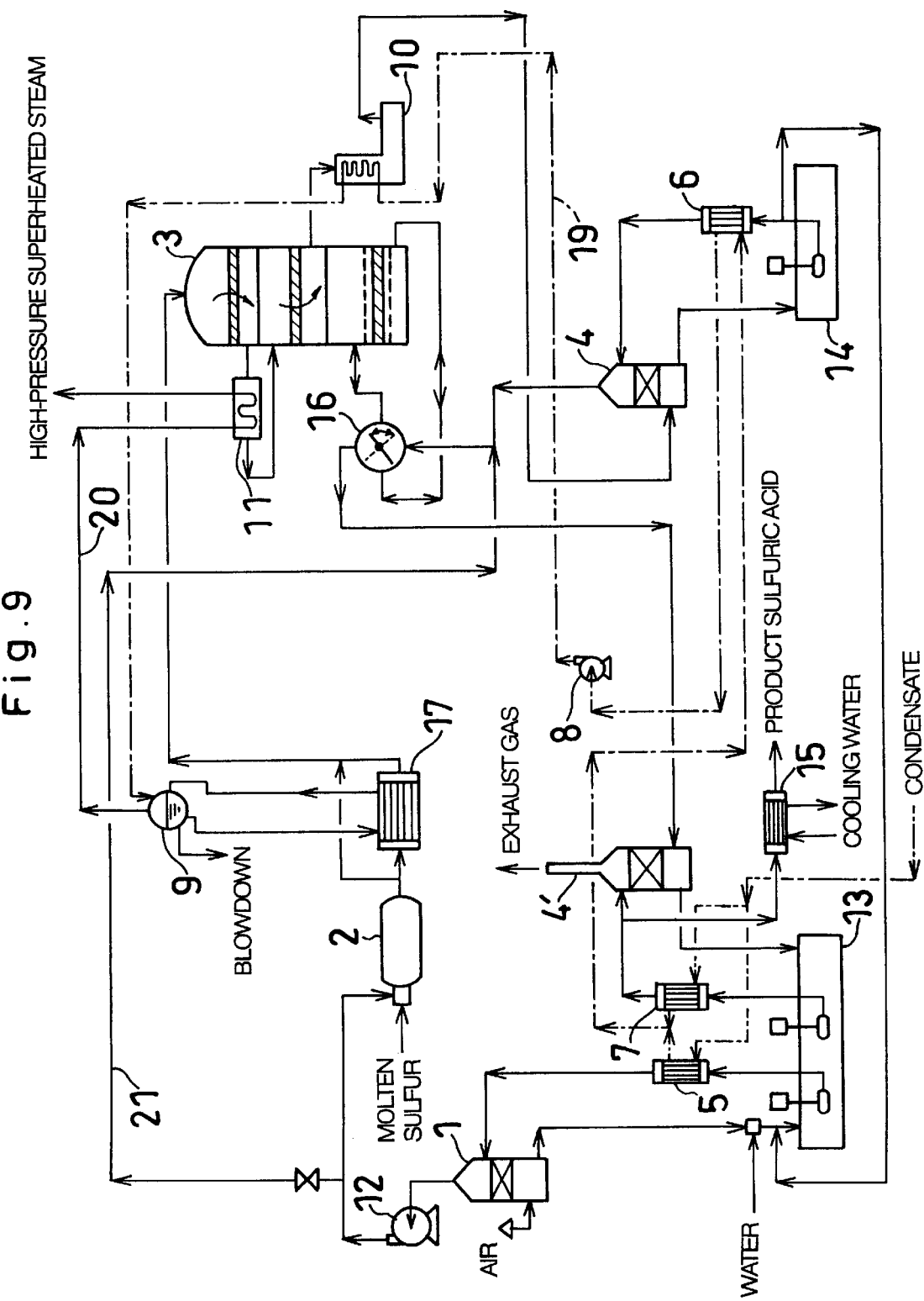
FIG. 9 is a flow chart showing Embodiment 9.

FIGS. 2 to 9 show modifications of the present invention. In the process of FIG. 2, the high-temperature fluid of the converter 3 serves as the heat source for the steam superheater 11, the second economizer is omitted, and a line for circulating the high-temperature fluid through the converter 3 and the second boiler is connected to the converter 3 at a location different from that in the process of FIG. 1. In the process of FIG. 3, a high-temperature fluid circulating line through the converter 3 and the second boiler and like line through the converter 3 and the second economizer are connected to the converter 3 at locations altered from those in the process of FIG. 1. In the process of FIG. 4, the heat source of the steam superheater 11 is the high-temperature fluid of the converter 3, and the heat source of the first economizer 10 is the high-temperature fluid from the second boiler. In the process of FIG. 5, the heat source of the steam superheater 11 is the high-temperature fluid of the converter 3, and the second economizer is omitted. In the process of FIG. 6, the heat source of the steam superheater 11 is the high-temperature fluid of the converter 3, and the second boiler is omitted. The process of FIG. 7 is smaller than the process of FIG. 1 in the number of stages of the converter 3, with the second boiler omitted. The process of FIG. 8 is smaller than the process of FIG. 1 in the number of stages of the converter 3, with the second economizer omitted. In the process of FIG. 9, the heat source of the steam superheater 11 is the high-temperature fluid of the converter 3, the number of stages of the converter 3 is smaller than in the process of FIG. 1, and both the second boiler and the second economizer are omitted.

The processes of FIGS. 2 to 9 are the same as the process of FIG. 1 with the exception of the above differences.

In the processes of FIGS. 2 to 9 as in the process of FIG. 1, the boiler water (condensate) supplied from utility equipment is first concurrently passed through the drying tower acid cooler 5 and the second absorption tower acid cooler 7 which are relatively low in concentrated sulfuric acid circulation temperature, and is heated to some extent. The boiler water to be supplied is then passed through the first absorption tower acid cooler 6 which is high in the acid circulation temperature, whereby the water is further. heated.

The boiler water flowing out of the first absorption tower acid cooler 6 has its pressure elevated by the boiler water supply pump 8, and is further heated in the first economizer 10 and/or the second economizers 10' by recovering heat from $SO_2$ gas and $SO_3$ gas, partly evaporated and given heat of higher temperature. The water is made into high-pressure steam when subsequently supplied to the boiler steam drum 9, and eventually made into high-pressure superheated steam of higher value for use, by the steam superheater 11 downstream from the drum.

The increases in the amount of high-pressure superheated steam achieved by the processes of FIGS. 2 to 9 are comparable to the increase attained by the process of FIG. 1.

What is claimed is:

1. In a sulfuric acid production plant including a drying tower for drying air with circulating concentrated sulfuric acid for burning molten sulfur serving as a material, a sulfur combustion furnace for burning the molten sulfur to produce sulfur dioxide, a converter for converting the sulfur dioxide to sulfur trioxide, and an absorption tower for causing the circulating concentrated sulfuric acid to absorb the sulfur trioxide produced by the conversion of the sulfur dioxide, a heat recovery method of heating the water to be supplied to a boiler by utilizing the heat generated by drying and/or absorption in the drying tower for drying the sulfur burning air or the sulfur dioxide and/or in the absorption tower for causing the circulating concentrated sulfuric acid to absorb the sulfur trioxide produced by the conversion of the sulfur dioxide.

2. A heat recovery method in a sulfuric acid production plant according to claim 1 wherein the water to be supplied to the boiler is heated by being passed through an acid cooler for cooling the drying tower and/or the absorption tower by circulating concentrated sulfuric acid therethrough.

3. A heat recovery method in a sulfuric acid production plant according to claim 2 wherein the water to be supplied to the boiler is heated to an extent by being passed concurrently through a drying tower acid cooler (5) and a second absorption tower acid cooler (7) which are relatively low (60 to 90° C.) in concentrated sulfuric acid circulation temperature, and the water is further heated by being subsequently passed through a first absorption tower acid cooler (6) which is high (90 to 120° C.) in concentrated sulfuric acid circulation temperature.

* * * * *